(12) United States Patent
Colgrove et al.

(10) Patent No.: US 10,013,317 B1
(45) Date of Patent: Jul. 3, 2018

(54) RESTORING A VOLUME IN A STORAGE SYSTEM

(71) Applicant: Pure Storage, Inc., Mountain View, CA (US)

(72) Inventors: John Colgrove, Los Altos, CA (US); Ethan Miller, Santa Cruz, CA (US); John Hayes, Mountain View, CA (US); Cary Sandvig, Palo Alto, CA (US); Christopher Golden, Mountain View, CA (US); Jianting Cao, Sunnyvale, CA (US)

(73) Assignee: Pure Storage, Inc., Mountain View, CA (US)

(*) Notice: Subject to any disclaimer, the term of this patent is extended or adjusted under 35 U.S.C. 154(b) by 0 days.

(21) Appl. No.: 15/291,373

(22) Filed: Oct. 12, 2016

Related U.S. Application Data

(63) Continuation of application No. 14/058,757, filed on Oct. 21, 2013.

(Continued)

(51) Int. Cl.
  *G06F 11/00* (2006.01)
  *G06F 11/14* (2006.01)
  (Continued)

(52) U.S. Cl.
  CPC .......... *G06F 11/1469* (2013.01); *G06F 3/061* (2013.01); *G06F 3/0604* (2013.01);
  (Continued)

(58) Field of Classification Search
  USPC .......................................................... 714/15
  See application file for complete search history.

(56) References Cited

U.S. PATENT DOCUMENTS

| | | | |
|---|---|---|---|
| 5,208,813 | A | 5/1993 | Stallmo |
| 5,403,639 | A | 4/1995 | Belsan |

(Continued)

FOREIGN PATENT DOCUMENTS

| | | |
|---|---|---|
| CN | 103370685 A | 10/2013 |
| CN | 103370686 A | 10/2013 |

(Continued)

OTHER PUBLICATIONS

Microsoft Corporation, "GCSettings.IsServerGC Property", Retrieved Oct. 27, 2013 via the WayBack Machine, 3 pages.

(Continued)

*Primary Examiner* — Sarai E Butler
(74) *Attorney, Agent, or Firm* — Edward J. Lenart; Kennedy Lenart Spraggins LLP

(57) ABSTRACT

A system and method for performing search optimization operations. In order to optimize lookups for received data requests, a storage controller attempts to collapse the medium graph, thus reducing the number of mediums in which the storage controller must look to find a given block. One technique for collapsing the medium graph involves promoting individual mappings from a lower-level medium to a higher-level medium. Another technique for collapsing the medium graph involves pushing medium range pointers higher up in the medium mapping table to reduce the number of mediums that must be searched.

20 Claims, 8 Drawing Sheets

Related U.S. Application Data

(60) Provisional application No. 61/751,142, filed on Jan. 10, 2013.

(51) Int. Cl.
*G06F 3/06* (2006.01)
*G06F 12/10* (2016.01)
*G06F 12/0875* (2016.01)

(52) U.S. Cl.
CPC .............. *G06F 3/065* (2013.01); *G06F 3/067* (2013.01); *G06F 3/0619* (2013.01); *G06F 3/0665* (2013.01); *G06F 3/0673* (2013.01); *G06F 11/1451* (2013.01); *G06F 12/10* (2013.01); *G06F 3/0608* (2013.01); *G06F 3/0641* (2013.01); *G06F 12/0875* (2013.01); *G06F 2212/1016* (2013.01); *G06F 2212/1032* (2013.01); *G06F 2212/1044* (2013.01); *G06F 2212/152* (2013.01); *G06F 2212/154* (2013.01); *G06F 2212/163* (2013.01); *G06F 2212/261* (2013.01); *G06F 2212/263* (2013.01)

(56) References Cited

U.S. PATENT DOCUMENTS

| | | | |
|---|---|---|---|
| 5,940,838 | A | 8/1999 | Schmuck et al. |
| 6,263,350 | B1 | 7/2001 | Wollrath et al. |
| 6,412,045 | B1 | 6/2002 | DeKoning et al. |
| 6,718,448 | B1 | 4/2004 | Ofer |
| 6,757,769 | B1 | 6/2004 | Ofer |
| 6,799,283 | B1 | 9/2004 | Masaaki et al. |
| 6,834,298 | B1 | 12/2004 | Singer et al. |
| 6,850,938 | B1 | 2/2005 | Sadjadi |
| 6,915,434 | B1 | 7/2005 | Kuroda |
| 6,973,549 | B1 | 12/2005 | Testardi |
| 7,028,216 | B2 | 4/2006 | Aizawa et al. |
| 7,028,218 | B2 | 4/2006 | Schwarm et al. |
| 7,039,827 | B2 | 5/2006 | Meyer et al. |
| 7,216,164 | B1 | 5/2007 | Whitmore et al. |
| 7,783,682 | B1 | 8/2010 | Patterson |
| 7,873,619 | B1 | 1/2011 | Faibish et al. |
| 7,913,300 | B1 | 3/2011 | Flank et al. |
| 7,933,936 | B2 | 4/2011 | Aggarwal et al. |
| 7,979,613 | B2 | 7/2011 | Zohar et al. |
| 8,086,652 | B1 | 12/2011 | Bisson et al. |
| 8,117,464 | B1 | 2/2012 | Kogelnik |
| 8,205,065 | B2 | 6/2012 | Matze |
| 8,352,540 | B2 | 1/2013 | Anglin et al. |
| 8,527,544 | B1 | 9/2013 | Colgrove et al. |
| 8,560,747 | B1 | 10/2013 | Tan et al. |
| 8,621,241 | B1 | 12/2013 | Stephenson |
| 8,700,875 | B1 | 4/2014 | Barron et al. |
| 8,751,463 | B1 | 6/2014 | Chamness |
| 8,806,160 | B2 | 8/2014 | Colgrove et al. |
| 8,874,850 | B1 | 10/2014 | Goodson et al. |
| 8,959,305 | B1 | 2/2015 | Lecrone et al. |
| 9,423,967 | B2 | 8/2016 | Colgrove et al. |
| 9,436,396 | B2 | 9/2016 | Colgrove et al. |
| 9,436,720 | B2 | 9/2016 | Colgrove et al. |
| 9,454,476 | B2 | 9/2016 | Colgrove et al. |
| 9,454,477 | B2 | 9/2016 | Colgrove et al. |
| 9,513,820 | B1 | 12/2016 | Shalev |
| 9,516,016 | B2 | 12/2016 | Colgrove et al. |
| 9,552,248 | B2 | 1/2017 | Miller et al. |
| 2002/0038436 | A1 | 3/2002 | Suzuki |
| 2002/0087544 | A1 | 7/2002 | Selkirk et al. |
| 2002/0178335 | A1 | 11/2002 | Selkirk et al. |
| 2003/0140209 | A1 | 7/2003 | Testardi |
| 2004/0049572 | A1 | 3/2004 | Yamamoto et al. |
| 2005/0066095 | A1 | 3/2005 | Mullick et al. |
| 2005/0216535 | A1 | 9/2005 | Saika et al. |
| 2005/0223154 | A1 | 10/2005 | Uemura |
| 2006/0074940 | A1 | 4/2006 | Craft et al. |
| 2006/0136365 | A1 | 6/2006 | Kedem et al. |
| 2006/0155946 | A1 | 7/2006 | Ji |
| 2007/0067585 | A1 | 3/2007 | Ueda et al. |
| 2007/0162954 | A1 | 7/2007 | Pela |
| 2007/0171562 | A1 | 7/2007 | Maejima et al. |
| 2007/0174673 | A1* | 7/2007 | Kawaguchi ......... G06F 11/1458 714/6.12 |
| 2007/0220313 | A1 | 9/2007 | Katsuragi et al. |
| 2007/0245090 | A1 | 10/2007 | King et al. |
| 2007/0266179 | A1 | 11/2007 | Chavan et al. |
| 2008/0059699 | A1 | 3/2008 | Kubo et al. |
| 2008/0065852 | A1 | 3/2008 | Moore et al. |
| 2008/0134174 | A1 | 6/2008 | Sheu et al. |
| 2008/0155191 | A1 | 6/2008 | Anderson et al. |
| 2008/0178040 | A1 | 7/2008 | Kobayashi |
| 2008/0209096 | A1 | 8/2008 | Lin et al. |
| 2008/0244205 | A1 | 10/2008 | Amano et al. |
| 2008/0275928 | A1 | 11/2008 | Shuster |
| 2008/0285083 | A1 | 11/2008 | Aonuma |
| 2008/0307270 | A1* | 12/2008 | Li ........................ G06F 11/073 714/47.2 |
| 2009/0006587 | A1 | 1/2009 | Richter |
| 2009/0037662 | A1 | 2/2009 | La Frese et al. |
| 2009/0204858 | A1 | 8/2009 | Kawaba |
| 2009/0228648 | A1 | 9/2009 | Wack |
| 2009/0300084 | A1 | 12/2009 | Whitehouse |
| 2010/0057673 | A1 | 3/2010 | Savov |
| 2010/0058026 | A1 | 3/2010 | Heil et al. |
| 2010/0067706 | A1 | 3/2010 | Anan et al. |
| 2010/0077205 | A1 | 3/2010 | Ekstrom et al. |
| 2010/0082879 | A1 | 4/2010 | McKean et al. |
| 2010/0106905 | A1 | 4/2010 | Kurashige et al. |
| 2010/0153620 | A1 | 6/2010 | McKean et al. |
| 2010/0153641 | A1 | 6/2010 | Jagadish et al. |
| 2010/0191897 | A1 | 7/2010 | Zhang et al. |
| 2010/0250802 | A1 | 9/2010 | Waugh et al. |
| 2010/0250882 | A1 | 9/2010 | Hutchison et al. |
| 2010/0281225 | A1 | 11/2010 | Chen et al. |
| 2010/0287327 | A1 | 11/2010 | Li et al. |
| 2011/0072300 | A1* | 3/2011 | Rousseau ............ G06F 12/0246 714/6.1 |
| 2011/0145598 | A1 | 6/2011 | Smith et al. |
| 2011/0161559 | A1 | 6/2011 | Yurzola et al. |
| 2011/0167221 | A1 | 7/2011 | Pangal et al. |
| 2011/0238634 | A1 | 9/2011 | Kobara |
| 2012/0023375 | A1 | 1/2012 | Dutta et al. |
| 2012/0036309 | A1 | 2/2012 | Dillow et al. |
| 2012/0117029 | A1 | 5/2012 | Gold |
| 2012/0198175 | A1 | 8/2012 | Atkisson |
| 2012/0330903 | A1 | 12/2012 | Periyagaram et al. |
| 2012/0330954 | A1 | 12/2012 | Sivasubramanian et al. |
| 2013/0042052 | A1 | 2/2013 | Colgrove et al. |
| 2013/0046995 | A1 | 2/2013 | Movshovitz |
| 2013/0047029 | A1 | 2/2013 | Ikeuchi et al. |
| 2013/0091102 | A1 | 4/2013 | Nayak |
| 2013/0205110 | A1 | 8/2013 | Kettner |
| 2013/0227236 | A1 | 8/2013 | Flynn et al. |
| 2013/0275391 | A1 | 10/2013 | Batwara et al. |
| 2013/0275656 | A1 | 10/2013 | Talagala et al. |
| 2013/0283058 | A1 | 10/2013 | Fiske et al. |
| 2013/0290648 | A1 | 10/2013 | Shao et al. |
| 2013/0318314 | A1 | 11/2013 | Markus et al. |
| 2013/0339303 | A1 | 12/2013 | Potter et al. |
| 2014/0052946 | A1 | 2/2014 | Kimmel |
| 2014/0068791 | A1 | 3/2014 | Resch |
| 2014/0089730 | A1 | 3/2014 | Watanabe et al. |
| 2014/0101361 | A1 | 4/2014 | Gschwind |
| 2014/0143517 | A1 | 5/2014 | Jin et al. |
| 2014/0172929 | A1 | 6/2014 | Sedayao et al. |
| 2014/0201150 | A1 | 7/2014 | Kumarasamy et al. |
| 2014/0215129 | A1 | 7/2014 | Kuzmin et al. |
| 2014/0229131 | A1 | 8/2014 | Cohen et al. |
| 2014/0229452 | A1 | 8/2014 | Serita et al. |
| 2014/0281308 | A1 | 9/2014 | Lango et al. |
| 2014/0325115 | A1 | 10/2014 | Ramsundar et al. |
| 2015/0234709 | A1 | 8/2015 | Koarashi |
| 2015/0244775 | A1 | 8/2015 | Vibhor et al. |
| 2015/0278534 | A1 | 10/2015 | Thiyagarajan et al. |

(56) References Cited

U.S. PATENT DOCUMENTS

2016/0019114 A1    1/2016   Han et al.
2016/0098191 A1    4/2016   Golden et al.
2016/0098199 A1    4/2016   Golden et al.

FOREIGN PATENT DOCUMENTS

| | | |
|---|---|---|
| CN | 104025010 B | 11/2016 |
| EP | 3066610 A1 | 9/2016 |
| EP | 3082047 A1 | 10/2016 |
| EP | 3120235 A | 1/2017 |
| JP | 2007-087036 A | 4/2007 |
| JP | 2007-094472 A | 4/2007 |
| JP | 2008-250667 A | 10/2008 |
| JP | 2010-211681 A | 9/2010 |
| WO | WO-1995/002349 A1 | 1/1995 |
| WO | WO-1999/013403 A1 | 3/1999 |
| WO | WO-2008/102347 A1 | 8/2008 |
| WO | WO-2010/071655 A1 | 6/2010 |

OTHER PUBLICATIONS

Microsoft Corporation, "Fundamentals of Garbage Collection", Retrieved Aug. 30, 2013 via the WayBack Machine, 11 pages.
PCT Search Report and Written Opinion, dated Mar. 24, 2014; 12 pages, PCT Application No. PCT/US2014/010885.

* cited by examiner

| Medium ID | Range | State | Basis | Offset | Underlying | Stable |
|---|---|---|---|---|---|---|
| 1 | 0-999 | Q | 1 | 0 | 1 | Y |
| 2 | 0-99 | QU | 2 | 0 | 1 | Y |
| 2 | 100-999 | Q | 2 | 0 | 1 | Y |
| 5 | 0-999 | RU | 5 | 0 | 2 | N |
| 8 | 0-499 | R | 8 | 500 | 1 | N |
| 10 | 0-999 | QU | 10 | 0 | 1 | Y |
| 14 | 0-999 | RU | 14 | 0 | 10 | Y |
| 18 | 0-999 | RU | 18 | 0 | 14 | N |
| 25 | 0-999 | RU | 25 | 0 | 14 | Y |
| 33 | 0-999 | RU | 33 | 0 | 25 | N |
| 35 | 0-299 | RU | 35 | 400 | 18 | N |
| 35 | 300-499 | RU | 35 | -300 | 33 | Y |
| 35 | 500-899 | RU | 35 | -400 | 5 | N |

Q – Quiescent; R – Registered; U – Unmask

FIG. 3

After Search Optimization Operation for Medium 54

Address Translation Table 500B

| Med. | Block | Page | Level |
|------|-------|------|-------|
| 54 | 200 | 18 | 7 |
| 37 | 700 | 21 | 12 |
| 38 | 300 | 11 | 8 |
| 54 | 0 | 21 | 12 |
| 54 | 100 | 11 | 8 |

Medium Mapping Table 505B

| Med. | Range | Offset | Underlying |
|------|-------|--------|------------|
| 37 | 0-999 | 0 | 37 |
| 38 | 0-499 | 500 | 37 |
| 54 | 0-299 | 0 | 54 |

Medium Graph 510B

| 54 | 54 | RW |

| 38 | 37 | RO |

| 37 | 1 | RO |

Before Search Optimization Operation for Medium 54

Address Translation Table 500A

| Med. | Block | Page | Level |
|------|-------|------|-------|
| 54 | 200 | 18 | 7 |
| 37 | 700 | 21 | 12 |
| 38 | 300 | 11 | 8 |

Medium Mapping Table 505A

| Med. | Range | Offset | Underlying |
|------|-------|--------|------------|
| 37 | 0-999 | 0 | 37 |
| 38 | 0-499 | 500 | 37 |
| 54 | 0-299 | 200 | 38 |

Medium Graph 510A

| 54 | 38 | RW |

| 38 | 37 | RO |

| 37 | 1 | RO |

FIG. 5

| Medium ID | Range | State | Basis | Offset | Underlying | Stable |
|---|---|---|---|---|---|---|
| 1 | 0-999 | Q | 1 | 0 | 1 | Y |
| 2 | 0-99 | QU | 2 | 0 | 1 | Y |
| 2 | 100-999 | Q | 2 | 0 | 1 | Y |
| 5 | 0-99 | RU | 5 | 0 | 2 | N |
| 5 | 100-999 | QU | 5 | 0 | 1 | N |

FIG. 6

RESTORING A VOLUME IN A STORAGE SYSTEM

CROSS-REFERENCE TO RELATED APPLICATIONS

This application is a continuation application of and claims priority from U.S. patent application Ser. No. 14/058,757, filed on Oct. 21, 2013, which claims the benefit of U.S. Provisional Application No. 61/751,142, filed Jan. 10, 2013.

BACKGROUND OF THE INVENTION

Field of the Invention

This invention relates to optimizing snapshot lookup operations in a storage system.

Description of the Related Art

As computer memory storage and data bandwidth increase, so does the amount and complexity of data that businesses daily manage. Large-scale distributed storage systems, such as data centers, typically run many business operations. A datacenter, which also may be referred to as a server room, is a centralized repository, either physical or virtual, for the storage, management, and dissemination of data pertaining to one or more businesses. A distributed storage system may be coupled to client computers interconnected by one or more networks. If any portion of the distributed storage system has poor performance, company operations may be impaired. A distributed storage system therefore maintains high standards for data availability and high-performance functionality.

Many techniques have been employed by storage systems to maintain high performance. For example, snapshots may be utilized to capture and store data at a particular point in time. A snapshot may be taken of a logical volume, and the snapshot may be stored to preserve the contents of the volume. If the data associated with the volume is later lost or corrupted, the volume can be restored from the snapshot.

As the amount of data corresponding to a snapshot increases, and as the overall number of snapshots being taken and stored increases, the storage utilization and processing overhead of the storage system likewise increases. The proliferation of snapshots in a storage system results in more processing overhead for the storage system as well as increasing numbers of lookups through multiple snapshots for some data requests. With time, the storage system may be required to manage a large number of snapshots, some of which may no longer be externally visible by clients.

In view of the above, systems and methods for optimizing snapshot lookup operations are desired.

SUMMARY OF THE INVENTION

Various embodiments of systems and methods for optimizing medium lookup operations are contemplated.

A storage system may include a storage controller and one or more storage devices. The storage system may be coupled to one or more host client systems. In one embodiment, the storage controller may utilize volumes and mediums to track client data that is stored in the storage system. A medium is defined as a logical grouping of data, and each medium has an identifier with which to identify the logical grouping of data. The storage controller may maintain a volume to medium mapping table to map each volume to a single medium, and this medium is referred to as the volume's anchor medium. Each medium may be mapped to any number of other mediums, and the storage controller may also maintain a medium mapping table to track relationships between anchor mediums and underlying mediums. The storage controller may also maintain an address translation table and corresponding indexes for mapping mediums and block numbers to physical storage locations.

In one embodiment, the storage controller may be configured to perform medium lookup optimizing operations on a periodic basis. The storage controller may search through all of the mediums in the system to find mediums that can be reduced or collapsed to make future searches of the system more efficient. The storage controller may look for active mediums in a read-write state which have one or more levels of underlying mediums beneath them, with each underlying medium representing a snapshot. These active mediums with one or more underlying mediums may be collapsed by the storage controller. The storage controller may not make changes that cause the result of a lookup of a block on a volume to change, but may make changes in mediums that are invisible from the point of view of all volumes on the storage controller.

In one embodiment, the storage controller may attempt to collapse the medium mapping table so as to reduce the number of mediums in which the storage controller will have to look to find data blocks for a given data request. The storage controller may collapse the medium mapping table by promoting individual mappings from lower-level mediums to higher-level mediums. The storage controller may also collapse the medium mapping table by pushing medium range pointers higher up in the table so as to reduce the number of mediums that need to be searched.

In one embodiment, the storage controller may promote individual mappings from existing entries in the address translation table into new entries for the destination medium. For a given medium with multiple levels of underlying mediums, all of the mappings for these levels of underlying mediums may be merged, resulting in a new version of the given medium. This process does not change the result of any individual mapping but rather improves the performance of the storage system by allowing the given medium to be converted into a quiesced medium that refers to itself. After receiving a data request targeting the given medium, the storage controller will have access to all of its mappings by performing a single lookup to the address translation table indexes for only the given medium.

In one embodiment, another technique may be utilized by the storage controller to reduce the number of lookups required by shortcutting the medium mapping table. In order to shortcut the medium mapping table, the system may collapse ranges of masked mediums together. A range of a medium is considered unmasked if one or more address translation table entries exist in the range for that medium, which indicates that the range has been previously written to. A range of a medium is considered masked if there are no entries in the range for that medium. If a first medium has multiple levels of underlying mediums below it, and its immediate underlying medium is masked, then a shortcut through the medium mapping table may be created, bypassing the medium directly below the first medium. In this case, a new entry may be created and entered into the medium mapping table, with the new entry mapping the first medium directly to a medium at least two levels below the first medium in the medium graph.

In another embodiment, another technique for collapsing the medium graph may be utilized by the storage controller.

This technique may involve merging one or more mediums that cannot be referenced externally into the medium directly above them in the medium graph. If a second medium underlies a first medium and the second medium is no longer externally visible, the storage controller may merge the second medium with the first medium, combining the entries of the second medium and the first medium and renumbering the entries.

The combination of these techniques can dramatically shrink the number of mediums in use by the storage system, particularly in systems that take frequent checkpoints and then delete the volumes which access the checkpoints. Also, in systems with long chains of mediums, these techniques can help reduce these chains and reduce the number of medium lookups that are performed for received data requests.

These and other embodiments will become apparent upon consideration of the following description and accompanying drawings.

BRIEF DESCRIPTION OF THE DRAWINGS

FIG. 3 illustrates one embodiment of a medium mapping table.

FIG. 5 is a generalized block diagram of one embodiment of a search optimization operation.

FIG. 6 illustrates one embodiment of a portion of a medium mapping table.

Figure 1:
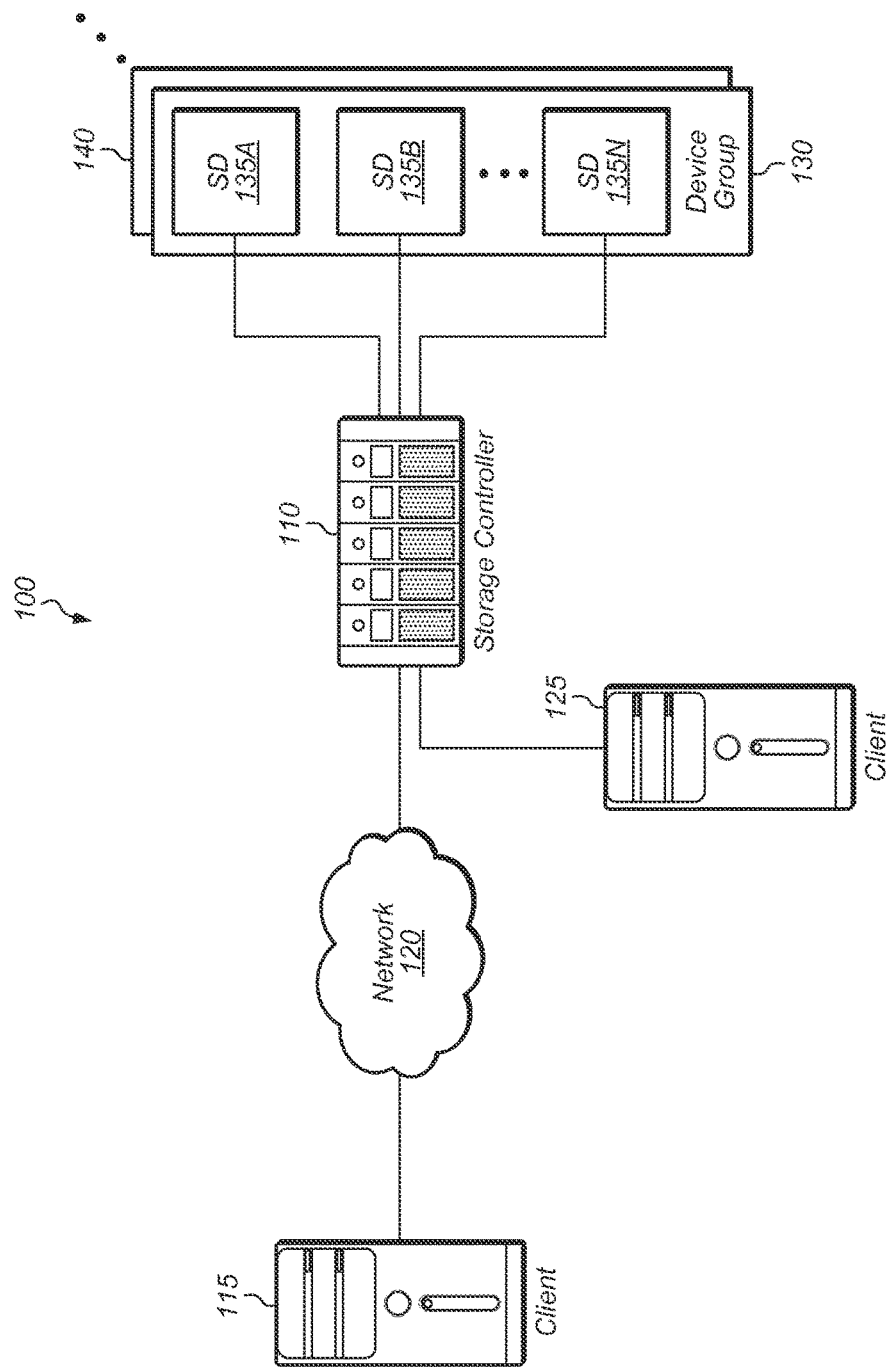
FIG. 1 is a generalized block diagram illustrating one embodiment of a storage system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Referring now to FIG. 1, a generalized block diagram of one embodiment of a storage system 100 is shown. Storage system 100 may include storage controller 110 and storage device groups 130 and 140, which are representative of any number of storage device groups (or data storage arrays). As shown, storage device group 130 includes storage devices 135A-N, which are representative of any number and type of storage devices (e.g., solid-state drives (SSDs)). Storage controller 110 may be coupled directly to client computer system 125, and storage controller 110 may be coupled remotely over network 120 to client computer system 115. Clients 115 and 125 are representative of any number of clients which may utilize storage controller 110 for storing and accessing data in system 100. It is noted that some systems may include only a single client, connected directly or remotely to storage controller 110.

Storage controller 110 may include software and/or hardware configured to provide access to storage devices 135A-N. Although storage controller 110 is shown as being separate from storage device groups 130 and 140, in some embodiments, storage controller 110 may be located within one or each of storage device groups 130 and 140. Storage controller 110 may include or be coupled to a base operating system (OS), a volume manager, and additional control logic for implementing the various techniques disclosed herein.

Storage controller 110 may include and/or execute on any number of processors and may include and/or execute on a single host computing device or be spread across multiple host computing devices, depending on the embodiment. In some embodiments, storage controller 110 may generally include or execute on one or more file servers and/or block servers. Storage controller 110 may use any of various techniques for replicating data across devices 135A-N to prevent loss of data due to the failure of a device or the failure of storage locations within a device. Storage controller 110 may also utilize any of various deduplication techniques for reducing the amount of data stored in devices 135A-N by deduplicating common data.

Storage controller 110 may also be configured to create and manage snapshots in system 100. A set of mediums may be recorded and maintained by storage controller 110. Most of the mediums may be read-only except for one or more selected mediums such as the most recent medium in use by a particular volume. Each medium logically comprises all of the blocks in the medium. However, only the blocks that were changed from the time the medium was created to the time the medium was closed are saved and mappings to these blocks may also be maintained with the medium.

In various embodiments, multiple mapping tables may be maintained by storage controller 110. These mapping tables may include a medium mapping table and a volume-to-medium mapping table. These tables may be utilized to record and maintain the mappings between mediums and underlying mediums and the mappings between volumes and mediums. Storage controller 110 may also include an address translation table with a plurality of entries, wherein each entry holds a virtual-to-physical mapping for a corresponding data component. This mapping table may be used to map logical read/write requests from each of the client computer systems 115 and 125 to physical locations in storage devices 135A-N. A "physical" pointer value may be read from the mappings associated with a given medium during a lookup operation corresponding to a received read/write request. This physical pointer value may then be used to locate a physical location within the storage devices 135A-N. It is noted the physical pointer value may be used to access another mapping table within a given storage device of the storage devices 135A-N. Consequently, one or more levels of indirection may exist between the physical pointer value and a target storage location.

In various embodiments, the address translation table may be accessed using a key comprising a medium ID, a logical or virtual address, a sector number, and so forth. A received read/write storage access request may identify a particular volume, sector, and length. The volume ID may be mapped to a medium ID using the volume to medium mapping table. A sector may be a logical block of data stored in a medium. Sectors may have different sizes on different mediums. The address translation table may map a medium in sector-size units. In other embodiments, other types of address translation tables may be utilized.

In one embodiment, the address translation table may map mediums to physical pointer values. For a given storage access request, an access may be made to the "mappings" of the address translation table. The term "mappings" is defined as the one or more entries of the address translation table which convert a given medium ID and block number into a physical pointer value. Depending on the embodiment, a physical pointer value may be a physical address or a logical address which the storage device maps to a physical location within the device. In one embodiment, an index may be utilized to access the address translation table. The index may identify locations of mappings within the address translation table. The index may be queried with a key value generated from a medium ID and sector number, and the index may be searched for one or more entries which match, or otherwise correspond to, the key value. Information from a matching entry may then be used to locate and retrieve a mapping which identifies a storage location which is the target of a received read or write request. In one embodiment, a hit in the index provides a corresponding virtual page ID identifying a page within the storage devices of the storage system, wherein the page stores both the key value and a corresponding physical pointer value. The page may then be searched with the key value to find the physical pointer value.

It is noted that in alternative embodiments, the number and type of client computers, storage controllers, networks, storage device groups, and data storage devices is not limited to those shown in FIG. 1. At various times one or more clients may operate offline. In addition, during operation, individual client computer connection types may change as users connect, disconnect, and reconnect to system 100. Further, the systems and methods described herein may be applied to directly attached storage systems or network attached storage systems and may include a host operating system configured to perform one or more aspects of the described methods. Numerous such alternatives are possible and are contemplated.

Network 120 may utilize a variety of techniques including wireless connection, direct local area network (LAN) connections, wide area network (WAN) connections such as the Internet, a router, storage area network, Ethernet, and others. Network 120 may comprise one or more LANs that may also be wireless. Network 120 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 120. The network 120 may interface with a set of communications protocols used for the Internet such as the Transmission Control Protocol (TCP) and the Internet Protocol (IP), or TCP/IP.

Client computer systems 115 and 125 are representative of any number of stationary or mobile computers such as desktop personal computers (PCs), servers, server farms, workstations, laptops, handheld computers, servers, personal digital assistants (PDAs), smart phones, and so forth. Generally speaking, client computer systems 115 and 125 include one or more processors comprising one or more processor cores. Each processor core includes circuitry for executing instructions according to a predefined general-purpose instruction set. For example, the x86 instruction set architecture may be selected. Alternatively, the ARM®, Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

Figure 2:
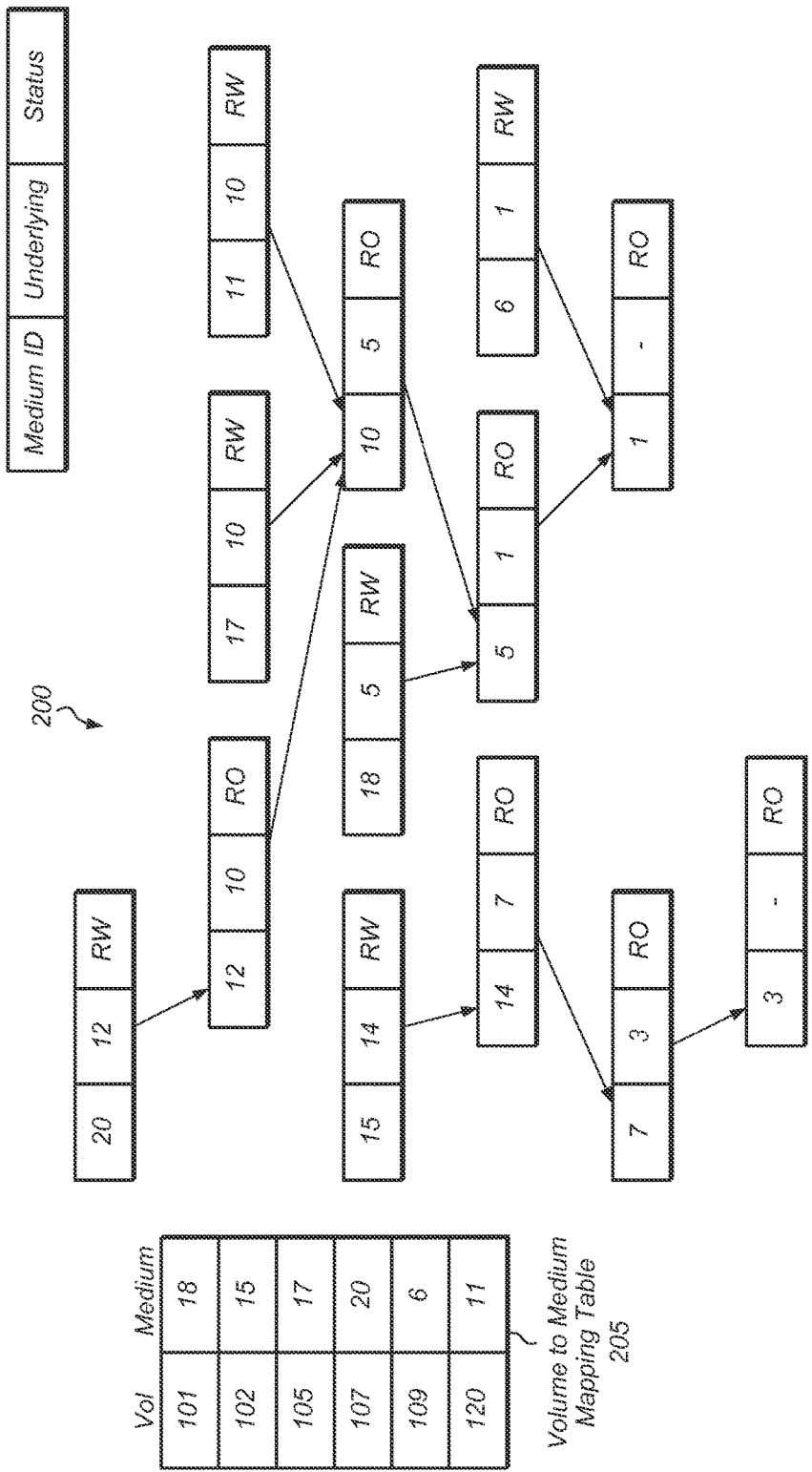
FIG. 2 is a generalized block diagram of one embodiment of a directed acyclic graph (DAG) of mediums.

Referring now to FIG. 2, a block diagram illustrating a directed acyclic graph (DAG) 200 of mediums is shown. Also shown is a volume to medium mapping table 205 which shows which medium a volume maps to for each volume in use by a storage system. Volumes may be considered pointers into graph 200.

The term "medium" as is used herein is defined as a logical grouping of data. A medium may have a corresponding identifier with which to identify the logical grouping of data. Each medium may also include or be associated with mappings of logical block numbers to content location, deduplication entries, and other information. In one embodiment, medium identifiers may be used by the storage controller but medium identifiers may not be user-visible. A user (or client) may send a data request accompanied by a volume ID to specify which data is targeted by the request, and the storage controller may map the volume ID to a medium ID and then use the medium ID when processing the request.

The term medium is not to be confused with the terms "storage medium" or "computer readable storage medium". A storage medium is defined as an actual physical device (e.g., SSD, HDD) that is utilized to store data. A computer readable storage medium (or non-transitory computer readable storage medium) is defined as a physical storage medium configured to store program instructions which are executable by a processor or other hardware device. Various types of program instructions that implement the methods and/or mechanisms described herein may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

It is also noted that the term "volume to medium mapping table" may refer to multiple tables rather than just a single table. Similarly, the term "medium mapping table" may also refer to multiple tables rather than just a single table. It is further noted that volume to medium mapping table 205 is only one example of a volume to medium mapping table. Other volume to medium mapping tables may have other numbers of entries for other numbers of volumes.

Each medium is depicted in graph 200 as three conjoined boxes, with the leftmost box showing the medium ID, the middle box showing the underlying medium, and the rightmost box displaying the status of the medium (RO—read-only) or (RW—read-write). Read-write mediums may be referred to as active mediums, while read-only mediums may represent previously taken snapshots. Within graph 200, a medium points to its underlying medium. For example, medium 20 points to medium 12 to depict that medium 12 is the underlying medium of medium 20. Medium 12 also points to medium 10, which in turn points to medium 5, which in turn points to medium 1. Some mediums are the underlying medium for more than one higher-level medium. For example, three separate mediums (12, 17, 11) point to medium 10, two separate mediums (18, 10) point to medium 5, and two separate mediums (6, 5) point to medium 1. Each of the mediums which is an underlying medium to at least one higher-level medium has a status of read-only.

The set of mediums on the bottom left of graph 200 is an example of a linear set. As depicted in graph 200, medium 3 was created first and then a snapshot was taken resulting in medium 3 becoming stable (i.e., the result of a lookup for a given block in medium 3 will always return the same value after this point). Medium 7 was created with medium 3 as its underlying medium. Any blocks written after medium 3 became stable were labeled as being in medium 7. Lookups to medium 7 return the value from medium 7 if one is found, but will look in medium 3 if a block is not found in medium 7. At a later time, a snapshot of medium 7 is taken, medium 7 becomes stable, and medium 14 is created. Lookups for blocks in medium 14 would check medium 7 and then medium 3 to find the targeted logical block. Eventually, a snapshot of medium 14 is taken and medium 14 becomes stable while medium 15 is created. At this point in graph 200, medium 14 is stable with writes to volume 102 going to medium 15.

Volume to medium mapping table 205 maps user-visible volumes to mediums. Each volume may be mapped to a single medium, also known as the anchor medium. This anchor medium, as with all other mediums, may take care of its own lookups. A medium on which multiple volumes depend (such as medium 10) tracks its own blocks independently of the volumes which depend on it. Each medium may also be broken up into ranges of blocks, and each range may be treated separately in medium DAG 200.

Referring now to FIG. 3, one embodiment of a medium mapping table 300 is shown. Any portion of or the entirety of medium mapping table 300 may be stored in storage controller 110 and/or in one or more of storage devices 135A-N. A volume identifier (ID) may be used to access volume to medium mapping table 205 to determine a medium ID corresponding to the volume ID. This medium ID may then be used to access medium mapping table 300. It is noted that table 300 is merely one example of a medium mapping table, and that in other embodiments, other medium mapping tables, with other numbers of entries, may be utilized. In addition, in other embodiments, a medium mapping table may include other attributes and be organized in a different manner than that shown in FIG. 3. It is also noted that any suitable data structure may be used to store the mapping table information in order to provide for efficient searches (e.g., b-trees, binary trees, hash tables, etc.). All such data structures are contemplated.

Each medium may be identified by a medium ID, as shown in the leftmost column of table 300. A range attribute may also be included in each entry of table 300, and the range may be in terms of data blocks. The size of a block of data (e.g., 4 KB, 8 KB) may vary depending on the embodiment. A medium may be broken up into multiple ranges, and each range of a medium may be treated as if it is an independent medium with its own attributes and mappings. Throughout this disclosure, there are various terms used to describe mediums as well as various techniques described for operating or performing actions on mediums. These terms and techniques also apply to ranges of mediums. For example, medium ID 2 has two separate ranges. Range 0-99 of medium ID 2 has a separate entry in table 300 from the entry for range 100-999 of medium ID 2.

Although both of these ranges of medium ID 2 map to underlying medium ID 1, it is possible for separate ranges of the same source medium to map to different underlying mediums. For example, separate ranges from medium ID 35 map to separate underlying mediums. For example, range 0-299 of medium ID 35 maps to underlying medium ID 18 with an offset of 400. This indicates that blocks 0-299 of medium ID 35 map to blocks 400-699 of medium ID 18. Additionally, range 300-499 of medium ID 35 maps to underlying medium ID 33 with an offset of −300 and range 500-899 of medium ID 35 maps to underlying medium ID 5 with an offset of −400. These entries indicate that blocks 300-499 of medium ID 35 map to blocks 0-199 of medium ID 33 while blocks 500-899 of medium ID 35 map to blocks 100-499 of medium ID 5. It is noted that in other embodiments, mediums may be broken up into more than three ranges.

The state column of table 300 records information that allows lookups for blocks to be performed more efficiently. A state of "Q" indicates the medium is quiescent, "R" indicates the medium is registered, and "U" indicates the medium is unmasked. In the quiescent state, a lookup is performed on exactly one or two mediums specified in table 300. In the registered state, a lookup is performed recursively. If an entry in table 300 is unmasked, then this indicates that a lookup should be performed in the basis medium. If an entry is masked, then the lookup should only be performed in the underlying medium. Although not shown in table 300 for any of the entries, another state "X" may be used to specify that the source medium is unmapped. The unmapped state indicates that the source medium contains no reachable data and can be discarded. This unmapped state may apply to a range of a source medium. If an entire medium is unmapped, then the medium ID may be entered into a sequence invalidation table and eventually discarded.

In one embodiment, when a medium is created, the medium is in the registered state if it has an underlying medium, or the medium is in the quiescent state if it is a brand-new volume with no pre-existing state. As the medium is written to, parts of it can become unmasked, with mappings existing both in the medium itself and the underlying medium. This may be done by splitting a single range into multiple range entries, some of which retain the original masked status, and others of which are marked as unmasked.

In addition, each entry in table 300 may include a basis attribute, which indicates the basis of the medium, which in this case points to the source medium itself. Each entry may also include an offset field, which specifies the offset that should be applied to the block address when mapping the source medium to an underlying medium. This allows mediums to map to other locations within an underlying medium rather than only being built on top of an underlying medium from the beginning block of the underlying medium. As shown in table 300, medium 8 has an offset of 500, which indicates that block 0 of medium 8 will map to block 500 of its underlying medium (medium 1). Therefore, a lookup of medium 1 via medium 8 will add an offset of 500 to the original block number of the request. The offset column allows a medium to be composed of multiple mediums. For example, in one embodiment, a medium may be composed of a "gold master" operating system image and per-VM (virtual machine) scratch space. Other flexible mappings are also possible and contemplated.

Each entry also includes an underlying medium attribute, which indicates the underlying medium of the source medium. If the underlying medium points to the source medium (as with medium 1), then this indicates that the source medium does not have an underlying medium, and all lookups will only be performed in the source medium. Each entry may also include a stable attribute, with "Y" (yes)

indicating the medium is stable (or read-only), and with "N" (no) indicating the medium is read-write. In a stable medium, the data corresponding to a given block in the medium never changes, though the mapping that produces this data may change. For example, medium 2 is stable, but block 50 in medium 2 might be recorded in medium 2 or in medium 1, which may be searched logically in that order, though the searches may be done in parallel if desired. In one embodiment, a medium will be stable if the medium is used as an underlying medium by any medium other than itself.

Figure 4:
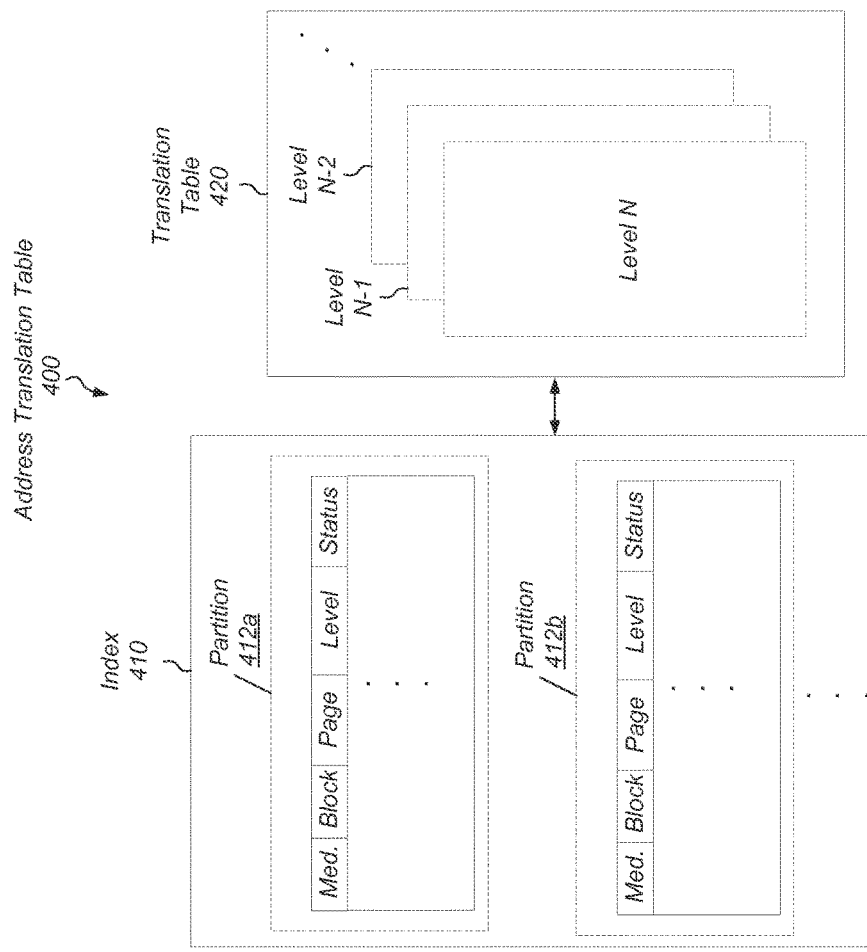
FIG. 4 illustrates a block diagram of one embodiment of an address translation table.

Turning now to FIG. 4, a block diagram of one embodiment of an address translation table 400 is shown. In one embodiment, a given received read/write request received by a storage controller may identify a particular volume, sector (or block number), and length. The volume may be translated into a medium ID using the volume-to-medium mapping table. The medium ID and block number may then be used to access index 410 of address translation table 400 to locate an index entry corresponding to the specific medium ID and block number. The index entry may store a level ID and page ID of a corresponding entry in translation table 420. Using the level ID, page ID, and a key value generated from the medium ID and block number, the corresponding translation table entry may be located and a pointer to the storage location may be returned from this entry. The pointer may be used to identify or locate data stored in the storage devices of the storage system. It is noted that in various embodiments, the storage system may include storage devices (e.g., SSDs) which have internal mapping mechanisms. In such embodiments, the pointer in the mapping table entry may not be an actual physical address per se. Rather, the pointer may be a logical address which the storage device maps to a physical location within the device.

For the purposes of this discussion, the key value used to access entries in index 410 is the medium ID and block number corresponding to the data request. However, in other embodiments, other types of key values may be utilized. In these embodiments, a key generator may generate a key from the medium ID, block number, and/or one or more other requester data inputs, and the key may be used to access index 410 and locate a corresponding entry.

When index 410 is accessed with a query key value, index 410 may be searched for one or more entries which match, or otherwise correspond to, the key value. Attributes from the matching entry may then be used to locate and retrieve a mapping in translation table 420. In one embodiment, a hit in the index provides a corresponding level ID and page ID identifying a level and page within translation table 420 storing both the key value and a corresponding physical pointer value. The page identified by the corresponding page ID may be searched with the key value so as to retrieve the corresponding pointer.

Translation table 420 may comprise one or more levels. For example, in various embodiments, table 420 may comprise 16 to 64 levels, although another number of levels supported within a mapping table is possible and contemplated. Three levels labeled Level "N", Level "N−1" and Level "N−2" are shown for ease of illustration. Each level within table 420 may include one or more partitions. In one embodiment, each partition is a 4 kilo-byte (KB) page. In one embodiment, a corresponding index 410 may be included in each level of translation table 420. In this embodiment, each level and each corresponding index 410 may be physically stored in a random-access manner within the storage devices.

In one embodiment, index 410 may be divided into partitions, such as partitions 412a-412b. In one embodiment, the size of the partitions may range from a 4 kilobyte (KB) page to 256 KB, though other sizes are possible and are contemplated. Each entry of index 410 may store a key value, and the key value may be based on the medium ID, block number, and other values. For the purposes of this discussion, the key value in each entry is represented by the medium ID and block number. This is shown merely to aid in the discussion of mapping between mediums and entries in index 410. In other embodiments, the key values of entries in index 410 may vary in how they are generated.

In various embodiments, portions of index 410 may be cached, or otherwise stored in a relatively fast access memory. In various embodiments, the entire index 410 may be cached. In some embodiments, where the primary index has become too large to cache in its entirety, or is otherwise larger than desired, secondary, tertiary, or other index portions may be used in the cache to reduce its size. In addition to the above, in various embodiments mapping pages corresponding to recent hits may be cached for at least some period of time. In this manner, processes which exhibit accesses with temporal locality can be serviced more rapidly (i.e., recently accessed locations will have their mappings cached and readily available).

In some embodiments, index 410 may be a secondary index which may be used to find a key value for accessing a primary index. The primary index may then be used for locating corresponding entries in address translation table 400. It is to be understood that any number of levels of indexes may be utilized in various embodiments. In addition, any number of levels of redirection may be utilized for performing the address translation of received data requests, depending on the embodiment. In another embodiment, index 410 may be a separate entity or entities from address translation table 400. It is noted that in other embodiments, other types of indexes and translation tables may be utilized to map medium IDs and block numbers to physical storage locations.

Referring now to FIG. 5, one embodiment of a search optimization operation is shown. The search optimization operation may be performed to collapse medium 54 into a medium that points to itself (i.e., has no underlying medium). This will ensure that future lookups to medium 54 are more efficient by only having to perform lookups to a single medium. As part of the search optimization operation, address translation table entries may be consolidated for medium 54, resulting in all of the blocks of medium 54 being mapped directly from medium 54 rather than from a lower level medium as was previously the case.

The left-side of FIG. 5 shows the status of medium 54 prior to the search optimization operation being performed. As shown in medium mapping table 505A, medium 54 has a range of 0-299 and an underlying medium of 38, and an offset of 200 is applied to blocks when going down to medium 38 from medium 54. It is noted that only the entries of the medium mapping table relevant to medium 54 are shown in table 505A, and the entries show only pertinent attributes to avoid cluttering the figure. Medium graph 510A illustrates the relationships between the mediums prior to the search optimization operation taking place. As can be seen from medium graph 510A, medium 54 points to medium 38, which in turn points to medium 37.

Also on the left-side of FIG. 5 is address translation table 500A. Table 500A shows only index entries associated with medium 54. These entries may actually be scattered throughout the overall address translation table but are shown as being adjacent entries in table 500A merely for ease of illustration. It is also noted that there may be other levels of indirection in the overall address translation table that convert a medium and block number to a corresponding storage location, but these other levels are not shown to avoid cluttering the figure. The index entries shown in table 500A represent all of the index entries in the address translation table associated with medium 54. While each entry in table 500A corresponds to a range size of 100 blocks, it is noted that in other embodiments, entries may correspond to other range sizes. In other embodiments, each entry in an address translation table may correspond to a smaller number of blocks. For example, in another embodiment, each entry in an address translation table may correspond to eight blocks.

It may be assumed for the purposes of this discussion that the storage controller performed a search to locate all index entries associated with medium 54, and the index entries shown in table 500A represent the result of this search. For block 0 of medium 54, there is not an index entry assigned to medium 54. Therefore, the storage controller would search for index entries corresponding to the underlying medium of medium 54, which in this case is medium 38. Since medium 54 maps to medium 38 with an offset of 200, block 0 of medium 54 translates to block 200 of medium 38, and so the storage controller would perform a search for block 200 of medium 38. It is assumed that this lookup also resulted in a miss, in which case the storage controller would search the underlying medium of 38, which in this case is medium 37. Since medium 38 maps to medium 37 with an offset of 500, block 200 of medium 38 translates to block 700 of medium 37. In this case, a lookup for block 700 of medium 37 results in a hit, and the entry corresponding to block 700 of medium 37 is shown in table 500A.

A search for block 100 of medium 54 would eventually locate the entry for block 300 of medium 38, and accordingly, an entry corresponding to block 300 of medium 38 is shown in table 500A. A search for block 200 of medium 54 would locate an entry assigned to medium 54, and therefore, an entry corresponding to block 200 of medium 54 is shown in table 500A. It will be assumed for the purposes of this discussion that the three entries shown in table 500A cover the entire address space of medium 54.

A storage controller may perform a search optimization operation for medium 54, and the results of this operation are shown on the right-side of FIG. 5. The first three entries of address translation table 500B are the same as the entries of table 500A. The entries assigned to medium 38 and medium 37 may be reclaimed by the storage controller if these blocks of medium 38 and medium 37 are no longer reachable (by upper-level mediums or by user volumes). However, these entries may remain in table 500B for a period of time prior to being reclaimed.

Two new entries have been added to table 500B as part of the search optimization operation, and these two entries are assigned to medium 54. These two new entries correspond to blocks 0 and 100 of medium 54, and attributes (e.g., page, level) may be copied from the corresponding existing entries and stored in the new entries. After the search optimization operation for medium 54 is performed, a lookup of table 500B for any block of medium 54 will result in a hit for this lookup. Therefore, future lookups of medium 54 will become more efficient. It is noted that other levels of address translation table 500B may also be updated as part of the search optimization operation for medium 54, but these updates are not shown in FIG. 5 to avoid cluttering the figure.

Medium mapping table 505B shows an updated entry for medium 54, which now points to itself as its own underlying medium. This is the case because a lookup of address translation table 500B for medium 54 will always result in a hit for any blocks of medium 54. Medium graph 510B also illustrates the new relationships between mediums after the search optimization operation, with medium 54 being its own underlying medium, and with medium 38 still pointing to medium 37.

Although not shown in FIG. 5, medium 54 may be the underlying medium of one or more other mediums. Any upper-level mediums that have medium 54 as their underlying medium may benefit from more efficient lookups after the search optimization operation is performed since they will have fewer underlying mediums to traverse now that medium 54 has been consolidated. In addition, mediums which have medium 54 as their underlying medium may be converted into quiesced mediums since lookups for these mediums will only have to search at most two mediums.

It is noted that in some embodiments, address translation tables 500A and 500B may have multiple levels of indirection and in these embodiments, each level of indirection which is accessed using a key generated from the medium ID and block number may be updated as part of the search optimization operation.

Although the example shown in FIG. 5 includes a small number of table entries and only two levels of underlying mediums beneath medium 54, in actual scenarios encountered by operational storage systems, the number of table entries and levels of underlying mediums may be substantially larger. In these embodiments, higher performance and efficiency gains can be attained by performing search optimization operations.

Turning now to FIG. 6, one embodiment of a portion of a medium mapping table 600 is shown. The entries for medium 5 shown in medium mapping table 600 illustrate another technique for medium graph collapsing by shortcutting the medium mapping table. Table 600 includes the same entries for medium 2 and medium 1 as shown in table 300 of FIG. 3. However, the entries for medium 5 have been updated to shortcut the table and reduce the number of lookups that are needed for medium 5.

Whereas medium 5 has a single entry in table 300 of FIG. 3, medium 5 now has two entries in table 600 after the shortcut has been created. Referring back to the single entry for medium 5 in table 300, the storage controller may detect that blocks 100-999 of medium 5 are only found in medium 2 (at the same offset), while these blocks in medium 2 are only found in medium 1. This condition may be detected by determining that blocks 100-999 of medium 2 are masked, which indicates that all blocks in this range are in the underlying medium (medium 1). Therefore, the storage controller may split up the single entry for medium 5 in table 300 into two range entries in table 600. The first new entry is for blocks 0-99 of medium 5, and this entry is still in the registered, unmasked (RU) state with underlying medium 2. The second new entry is for blocks 100-999 of medium 5, and this entry is in the quiescent, unmasked (QU) state with underlying medium 1. Lookups for blocks 100-999 of medium 5 may now be performed in a single underlying medium search (medium 1) rather than requiring the storage controller to traverse two underlying mediums (medium 2 and medium 1).

Another technique for collapsing the medium graph is to merge one or more mediums that cannot be referenced externally. These one or more mediums may be merged to the medium directly above them in the medium graph. For example, referring back to table 300 of FIG. 3, if medium 10 were no longer externally visible, the storage controller could merge medium 10 with medium 14 by coalescing entries in medium 10 into medium 14 and renumbering these entries. While the storage controller could merge the mappings in medium 14 into medium 25, the storage controller could not then delete medium 14 because medium 18 still uses medium 14 as its underlying medium, even though medium 14 might not be externally visible.

Figure 7:
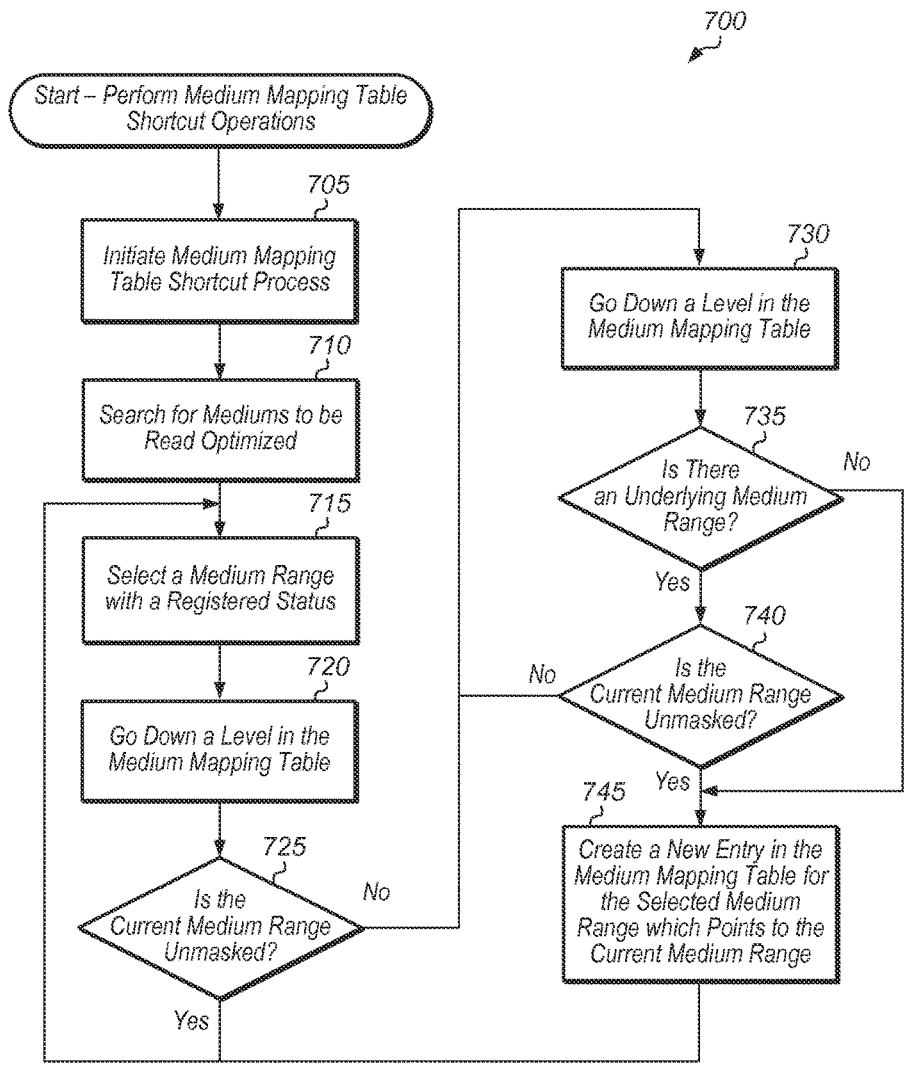
FIG. 7 is a generalized flow diagram illustrating one embodiment of a method for shortcutting a medium mapping table.

The combination of all of these techniques can dramatically shrink the number of mediums in use by a storage system. For storage systems that take frequent checkpoints and then forget them or lack external mappings to a portion of these checkpoints, these techniques can be especially beneficial for reducing the total number of mediums. In addition, for storage systems with long chains of mediums, these techniques can help ensure that lookups can be performed efficiently Referring now to FIG. 7, one embodiment of a method 700 for shortcutting a medium mapping table is shown. The components embodied in system 100 described above (e.g., storage controller 110) may generally operate in accordance with method 700. In addition, the steps in this embodiment are shown in sequential order. However, some steps may occur in a different order than shown, some steps may be performed concurrently, some steps may be combined with other steps, and some steps may be absent in another embodiment.

The storage controller may initiate a process for shortcutting the medium mapping table (block 705). In one embodiment, this process for shortcutting the medium mapping table may only be one of multiple techniques for collapsing the medium graph and optimizing lookups that may be implemented. For example, this process for shortcutting may be combined with a process for consolidating entries in the medium mapping table (as described below in FIG. 8). Other techniques may also be combined with these methods to optimize lookups and reduce the number of mediums in the storage system.

Next, the storage controller may search for mediums to be read optimized (block 710). Next, the storage controller may select a medium range that has a status of registered (block 715). If a medium range has a registered status, this indicates that there are two or more levels of underlying medium ranges below this medium range. A status of registered also indicates that a search for blocks in that medium range may proceed recursively through multiple medium ranges. The medium range selected in block 715 may also be referred to as the original medium range for the purposes of this discussion. It is noted that in some cases, the selected medium may only have a single entry in the medium mapping table corresponding to a single range.

After selecting a medium range, the storage controller may go down a level in the medium mapping table (block 720). The operation of going down a level refers to finding the entry that corresponds to the medium range which underlies the selected medium range. It is noted that this underlying medium range may be broken up into multiple ranges and may have multiple entries in the medium mapping table corresponding to the selected medium range. For these cases, each range of the underlying medium range may be processed separately and the following steps of method 700 may continue in parallel for each of these ranges. Alternatively, the steps of method 700 may continue for a first entry corresponding to a first range, and when the steps of method 700 have been completed for the first entry, the second entry for the underlying medium range may be processed, then the third entry, and so on. Also, in some cases, an offset may be applied to the original block numbers when going down a level from the original medium range to the underlying medium range. After going down a level in the medium mapping table in block 720, the underlying medium range may now be referred to as the current medium range for the discussion pertaining to blocks 725-730 of method 700.

After block 720, the storage controller may determine if the current medium range is unmasked (conditional block 725). In one embodiment, this may be determined by checking the status of the current medium range in the medium mapping table. If the current medium range is unmasked (conditional block 725, "yes" leg), then method 700 may return to block 715 and the storage controller may select another medium range that has a registered status.

If the current medium is unmasked, this indicates that this medium has its own mappings for at least a portion of its associated data. Therefore, it is not possible to create a shortcut around this medium. Accordingly, the storage controller may select another medium range with a registered status. If the current medium range is masked (conditional block 725, "no" leg), then the storage controller may go down a level in the medium mapping table by going to the medium range which underlies the current medium range (block 730). If the current medium range is masked, this indicates that the current medium range does not have any mappings assigned to itself and that all mappings are assigned to lower-level medium ranges. Accordingly, a shortcutting of the medium mapping table can be implemented since all data blocks of the current medium range will end up being mapped through to a lower-level medium range. Method 700 continues after block 730 by determining how many levels can be shortcut from the table, since in some cases, more than one level may be shortcut from the medium mapping table. It is noted that when going down a level in the medium mapping table, this lower-level medium range may be split up into multiple ranges which correspond to the current medium range. In these cases, the remaining steps of method 700 may be performed separately for each range of this lower-level medium range. Each range may be handled in a parallel or in a serial fashion. After block 730, after going down a level in the medium mapping table, this underlying medium range (of the current medium range) may now be referred to as the current medium range for the remaining steps of method 700.

After block 730, the storage controller may determine if the current medium range has an underlying medium range (conditional block 735). If the current medium range has an underlying medium range (conditional block 735, "yes" leg), then the storage controller may determine if the current medium range is unmasked (conditional block 740). If the current medium range does not have an underlying medium range (conditional block 735, "no" leg), then the storage controller may create a new entry in the medium mapping table for the original medium range which points to the current medium range as its underlying medium range (block 745). This entry may be for a portion of the original medium range or for the entirety of the original medium range, depending on the circumstances detected when performing blocks 720 and 730. This new entry effectively shortcuts the medium mapping table and will make future lookups of the original medium range more efficient. The storage controller may use any of various techniques for determining when to reclaim the old entry which is being replaced by this new entry. After block 745, method 700 may return to block 715 to select a medium range with a registered status.

If the current medium range is unmasked (conditional block 740, "yes" leg), then the storage controller may create a new entry in the medium mapping table for the original medium range which points to the current medium range as its underlying medium range (block 745). If the current medium range is masked (conditional block 740, "no" leg), then method 700 may return to block 730 to go down to a lower level in the medium mapping table. In this case, a shortcut of the table may span more than one level if each of the two or more intermediate levels (between the original medium range and the current medium range) have an underlying medium range and are masked.

Figure 8:
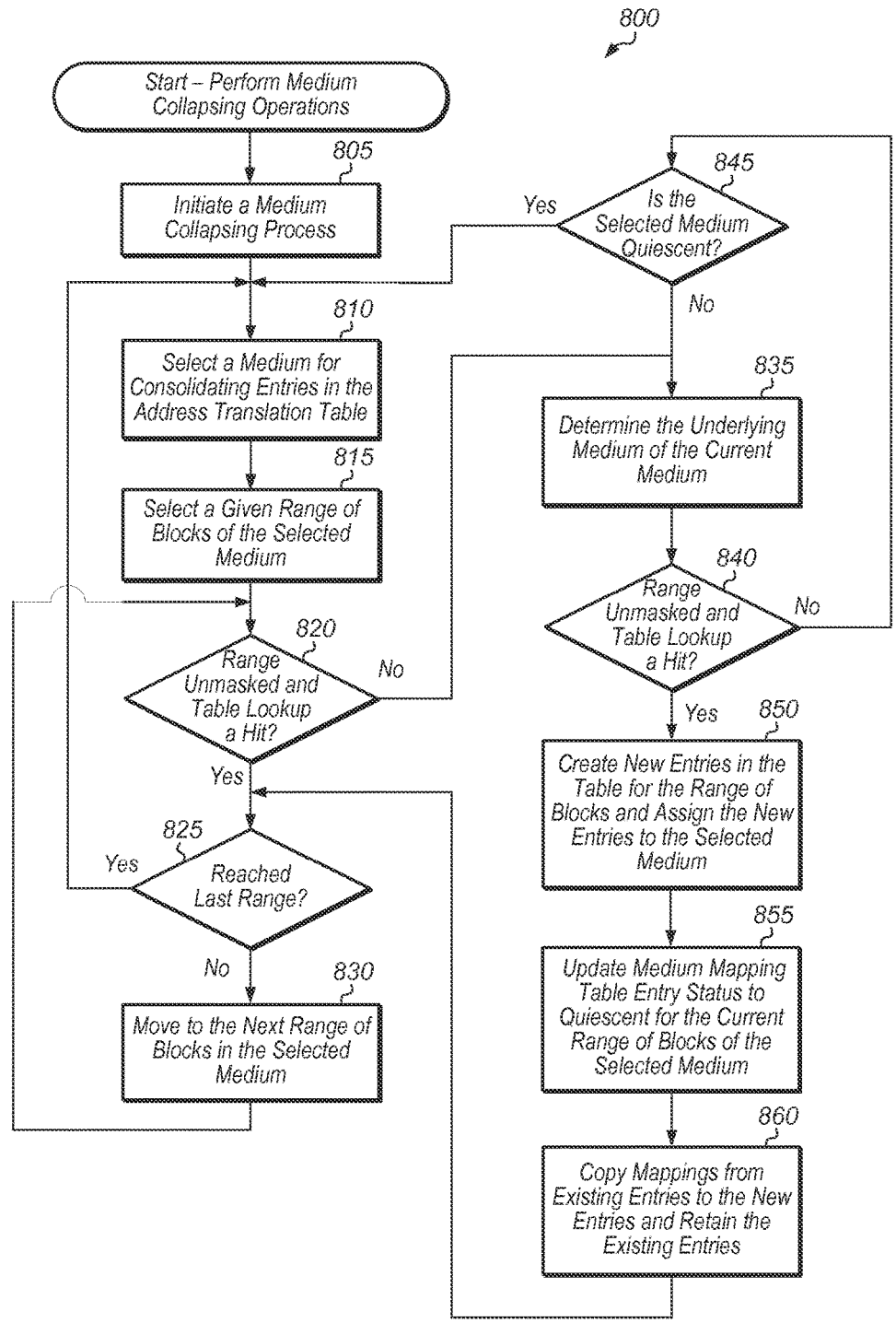
FIG. 8 is a generalized flow diagram illustrating one embodiment of a method for performing medium graph collapsing operations.

Turning now to FIG. 8, one embodiment of a method 800 for collapsing the medium mapping table is shown. The components embodied in system 100 described above (e.g., storage controller 110) may generally operate in accordance with method 800. In addition, the steps in this embodiment are shown in sequential order. However, some steps may occur in a different order than shown, some steps may be performed concurrently, some steps may be combined with other steps, and some steps may be absent in another embodiment.

The storage controller may initiate a medium mapping table collapsing process (block 805). The conditions which trigger the initiation of the medium mapping table collapsing process may vary from embodiment to embodiment. For example, in one embodiment, if the storage controller determines that the number of mediums exceeds a programmable threshold, then the medium mapping table collapsing may be initiated. Alternatively, if the storage controller has idle processing resources, then the storage controller may utilize these processing resources to run the medium mapping table collapsing process. In other embodiments, the storage controller may initiate the medium mapping table collapsing process on a periodic basis (e.g., daily, twice a week).

The medium mapping table collapsing process may select a medium for consolidating entries in the address translation table (block 810). In one embodiment, a medium with a long chain of underlying mediums may be selected for consolidating entries. For example, the storage controller may select a given medium for consolidation if the given medium has a chain of underlying mediums that is greater than a programmable threshold. Other techniques for selecting a medium for consolidation are possible and are contemplated.

Next, the storage controller may select a given range of blocks of the selected medium (block 815). The size of the range may vary depending on the characteristics of the selected medium. In one embodiment, the storage controller may begin with a first range of blocks starting with the smallest number and proceeding to higher numbers. Alternatively, the storage controller may begin with the highest range of blocks based on block number and proceed to lower numbers on successive searches. Alternatively, the storage controller may process the different ranges of blocks in any order.

If the selected medium is unmasked for the current range of blocks and if an address translation table lookup for the current range of blocks of the selected medium results in a hit (conditional block 820, "yes" leg), then the storage controller may determine if the last range of blocks for the selected medium has already been reached (conditional block 825). If the given range of blocks has an entry assigned to the selected medium in the index of the address translation table, then the storage controller does not need to consolidate this entry since the entry is already assigned to the selected medium and can be found using a key generated from the selected medium.

If the storage controller has already reached the last range of blocks for the selected medium (conditional block 825, "yes" leg), then method 800 may return to block 810 and select a new medium to consolidate. If the storage controller has not yet reached the last range of blocks for the selected medium (conditional block 825, "no" leg), then the storage controller may move to the next range of blocks of the selected medium for searching (block 830), and then method 800 may return to conditional block 820.

If the selected medium is masked for the current range of blocks or if the address translation table lookup for the current range of blocks using the selected medium results in a miss (conditional block 820, "no" leg), then the storage controller may determine the underlying medium of the selected medium (block 835). In one embodiment, the storage controller may query the medium mapping table to determine the underlying medium of the selected medium. The storage controller may also determine if an offset should be applied to the block number in the underlying medium from the original block number of the selected medium. Next, the storage controller may determine if the underlying medium is unmasked for the current range of blocks and if an address translation table lookup for the current range of blocks using the underlying medium results in a hit (conditional block 840). The storage controller may use a key generated from the underlying medium and current range of blocks for the address translation table lookup (with an offset applied to the block numbers, if applicable).

If the underlying medium is masked for the current range of blocks or if the address translation table lookup for the current range of blocks using the selected medium results in a miss (conditional block 840, "no" leg), then the storage controller may determine if the selected medium is quiescent (conditional block 845). If the selected medium is quiescent (conditional block 845, "yes" leg), then this indicates that there are no more underlying mediums to search, and method 800 may return to block 810 to select a new medium for consolidating entries. If the selected medium is not quiescent (conditional block 845, "no" leg), then the storage controller may return to block 835 to determine the underlying medium of the current medium.

If the underlying medium is unmasked for the current range of blocks and if an address translation table lookup for the current range of blocks using the underlying medium results in a hit (conditional block 840, "yes" leg), then the storage controller may create one or more new entries in the address translation table for the current range of blocks and assign the new entries to the selected medium (block 850). Each new entry may include a key generated from the selected medium ID and the range of blocks as mapped from the selected medium. This range of blocks may be different from the current range if an offset was applied to the underlying medium by the medium above it in the medium graph. Next, the storage controller may update the medium mapping table entry status to quiescent for the current range of blocks of the selected medium (block 855).

Next, the storage controller may copy mappings from the existing entries (assigned to the underlying medium) of the address translation table to the new entries while retaining the existing entries (block 860). However, in some embodiments, the storage controller may reclaim the existing entries for the underlying medium if the region of the underlying medium corresponding to the existing entries is not reachable by any other mediums. After block 860, method 800 may return to block 825 to determine if the last range of blocks has been reached for the selected medium.

In some embodiments, method 700 (of FIG. 7) and method 800 may be performed concurrently in various combinations to merge mappings and consolidate mediums. For example, method 700 may be performed on a first medium to shortcut the medium mapping table while method 800 is being performed in parallel on a second medium to collapse the medium mapping table for the second medium. Additionally, method 700 may be performed on multiple different mediums in parallel while method 800 is also performed on multiple different mediums in parallel. By combining method 700 and method 800 (and one or more other techniques), the number of mediums in the storage system may be reduced and future lookups to mediums may be optimized.

It is also noted that as part of the process of merging mappings and consolidating mediums, adjacent mappings may be merged if these adjacent mappings are compatible so as to further reduce the size of the medium mapping table. Adjacent mappings may be considered compatible if they have the same attributes and can be combined into a single entry in the medium mapping table. For example, a given medium 900 may have two adjacent entries. The first of these entries may be for a range of 0-99, with the underlying medium set to 905, and with a status of quiescent. The second entry may be for a range of 100-399 with the underlying medium set to 905, and with a status of quiescent. These two entries can be merged into a single with a range of 0-399, with the underlying medium set to 905, and with a status of quiescent. After a storage controller has promoted mappings to higher-level mediums while performing medium collapsing operations, it is customary to find many adjacent entries with the same attributes scattered throughout the medium mapping table. Accordingly, these adjacent entries may be merged to further reduce the size of the medium mapping table.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for use in a storage system, the method comprising:
receiving a request to restore a logical volume that represents logical storage on the storage system; and
responsive to receiving the request to restore the logical volume:
determining that the logical volume previously mapped to a logical data representation that currently maps to data stored on the storage system; and
in response to determining that the logical volume previously mapped to the logical data representation that currently maps to data stored on the storage system, restoring the connection between the logical volume and the data stored on the storage system by logically remapping the logical volume to the logical data representation.

2. The method of claim 1 wherein logically remapping the logical volume to the logical data representation includes:
creating a new entry in a volume to logical data representation mapping table, wherein the new entry includes an indication that the logical volume is mapped to the logical data representation.

3. The method of claim 1 wherein logically remapping the logical volume to the logical data representation includes:
creating a second logical data representation of the logical volume;
storing an indication that the second logical data representation is mapped to the logical data representation; and
creating a new entry in a volume to representation mapping table, wherein the new entry includes a second indication that the logical volume is mapped to the second logical data representation.

4. The method of claim 1 further comprising indicating within a volume to logical data representation mapping table that the logical volume was previously mapped to the data logical representation; wherein the logical data representation refers to a point-in-time of the data stored on the storage system.

5. The method of claim 1 further comprising:
receiving a request to delete the logical volume;
responsive to receiving the request to delete the logical volume:
determining the logical volume is mapped to a particular logical data representation of the logical volume;
indicating that the logical volume was previously mapped to the particular logical data representation of the logical volume; and
removing any indication that the logical volume is valid.

6. The method of claim 5 further comprising maintaining a volume to logical data representation mapping table to track relationships between volumes and logical data representations of volumes; wherein removing any indication that the logical volume is valid comprises deleting, within the volume to logical data representation mapping table, an entry corresponding to the logical volume.

7. The method of claim 5 further comprising responsive to receiving the request to delete the logical volume, delaying deletion of the particular logical data representation for a first period of time.

8. A computer system comprising:
one or more storage devices; and
a storage controller coupled to the one or more storage devices, wherein the storage controller is configured to:
receive a request to restore a logical volume that represents logical storage on the storage system; and
responsive to receiving the request to restore the logical volume:
determine that the logical volume previously mapped to a logical data representation that currently maps to data stored on the storage system; and
in response to determining that the logical volume previously mapped to the logical data representation that currently maps to data stored on the storage system, restore the connection between the logical volume and the data stored on the storage system by logically remapping the logical volume to the logical data representation.

9. The computer system of claim 8 wherein logically remapping the logical volume to the logical data representation includes:
creating a new entry in a volume to logical data representation mapping table, wherein the new entry includes an indication that the logical volume is mapped to the logical data representation.

10. The computer system of claim 8 wherein logically remapping the logical volume to the logical data representation includes:
creating a second logical data representation of the logical volume;
storing an indication that the second logical data representation is mapped to the logical data representation; and
creating a new entry in a volume to representation mapping table, wherein the new entry includes a second indication that the logical volume is mapped to the second logical data representation.

11. The computer system of claim 8 wherein the storage controller is further configured to indicate within a volume to logical data representation mapping table that the logical volume was previously mapped to the data logical representation; wherein the logical data representation refers to a point-in-time of the data stored on the storage system.

12. The computer system of claim 8, wherein the storage controller is further configured to:
receive a request to delete the logical volume;
responsive to receiving the request to delete the logical volume:
determine the logical volume is mapped to a particular logical data representation of the logical volume;
indicate that the logical volume was previously mapped to the particular logical data representation of the logical volume; and
remove any indication that the logical volume is valid.

13. The computer system of claim 12 wherein the storage controller is further configured to: maintain a volume to logical data representation mapping table to track relationships between volumes and logical data representations of volumes; wherein removing any indication that the logical volume is valid comprises deleting, within the volume to logical data representation mapping table, an entry corresponding to the logical volume.

14. The computer system of claim 12 wherein the storage controller is further configured to: responsive to receiving the request to delete the logical volume, delay deletion of the particular logical data representation for a first period of time.

15. A non-transitory computer readable storage medium storing program instructions, wherein the program instructions are executable by a processor to:
receive a request to restore a logical volume; and
responsive to receiving the request to restore the logical volume that represents logical storage on the storage system:
determine that the logical volume previously mapped to a logical data representation that currently maps to data stored on the storage system; and
in response to determining that the logical volume previously mapped to the logical data representation that currently maps to data stored on the storage system, restore the connection between the logical volume and the data stored on the storage system by logically remapping the logical volume to the logical data representation.

16. The computer readable storage medium of claim 15 includes:
creating a new entry in a volume to logical data representation mapping table, wherein the new entry includes an indication that the logical volume is mapped to the logical data representation.

17. The computer readable storage medium of claim 15 wherein logically remapping the logical volume to the logical data representation includes:
creating a second logical data representation of the logical volume;
storing an indication that the second logical data representation is mapped to the logical data representation; and
creating a new entry in a volume to representation mapping table, wherein the new entry includes a second indication that the logical volume is mapped to the second logical data representation.

18. The computer readable storage medium of claim 15 wherein the program instructions are executable by a processor to indicate within a volume to logical data representation mapping table that the logical volume was previously mapped to the logical data representation; wherein the logical data representation refers to a point-in-time of the data stored on the storage system.

19. The computer readable storage medium of claim 15, wherein the program instructions are executable by a processor to:
receive a request to delete the logical volume;
responsive to receiving the request to delete the logical volume:
determine the logical volume is mapped to a particular logical data representation of the logical volume;
indicate that the logical volume was previously mapped to the particular logical data representation of the logical volume; and
remove any indication that the logical volume is valid.

20. The computer readable storage medium of claim 19 wherein the program instructions are executable by a processor to: maintain a volume to logical data representation mapping table to track relationships between volumes and logical data representations of volumes; wherein removing any indication that the logical volume is valid comprises deleting, within the volume to logical data representation mapping table, an entry corresponding to the logical volume.

* * * * *